US012343295B2

(12) United States Patent
Nemoto et al.

(10) Patent No.: US 12,343,295 B2
(45) Date of Patent: Jul. 1, 2025

(54) STANDING-UP ASSIST DEVICE

(71) Applicant: HONDA MOTOR CO., LTD., Tokyo (JP)

(72) Inventors: Tomoyuki Nemoto, Wako (JP); Tomohiro Tsukamoto, Wako (JP); Takeshi Koshiishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 17/950,380

(22) Filed: Sep. 22, 2022

(65) Prior Publication Data

US 2023/0129851 A1 Apr. 27, 2023

(30) Foreign Application Priority Data

Oct. 22, 2021 (JP) ................................ 2021-173448

(51) Int. Cl.
*A61G 7/10* (2006.01)

(52) U.S. Cl.
CPC ........ *A61G 7/1019* (2013.01); *A61G 2200/34* (2013.01)

(58) Field of Classification Search
CPC .............. A61G 7/1019; A61G 2200/34; A61G 7/1017; A61G 7/1046; A61G 7/1086; A61G 5/14; A61G 7/1065; A61G 5/00; A61G 7/10; A61G 5/04; A61G 7/1096; A61G 2200/36; A61G 2203/10; A61G 2203/20; A61G 2203/22; A61G 2203/70; A61H 1/005; A61H 2201/164; A61H 2203/0406
See application file for complete search history.

(56) References Cited

U.S. PATENT DOCUMENTS

| | | | | |
|---|---|---|---|---|
| 2015/0359691 A1* | 12/2015 | Isozumi | A61G 5/04 180/19.1 |
| 2015/0359694 A1 | 12/2015 | Suzuki et al. | |
| 2017/0216119 A1 | 8/2017 | Tsusaka et al. | |
| 2017/0340495 A1* | 11/2017 | Paul | A61G 5/127 |

(Continued)

FOREIGN PATENT DOCUMENTS

| | | | |
|---|---|---|---|
| CN | 108042283 A * | 5/2018 | |
| DK | 177734 B1 * | 5/2015 | A61G 7/1096 |
| JP | 3166214 U | 2/2011 | |

(Continued)

OTHER PUBLICATIONS

Japanese Office Action corresponding to Japanese Application No. 2021-173448, dated Aug. 20, 2024, 9 pages.

*Primary Examiner* — David R Hare
*Assistant Examiner* — George Samuel Gines
(74) *Attorney, Agent, or Firm* — Rankin, Hill & Clark LLP

(57) ABSTRACT

A standing-up assist device including: a base portion; a shaft portion, having one end connected to the base portion, capable of moving at least up and down; a support portion provided at another end of the shaft portion; a control unit for controlling movement of the shaft portion; and a user information input unit to which information of a user is input, wherein, when a speed at which the support portion moves when the user is standing up is defined as a first moving speed, the control unit changes the first moving speed according to at least any of physical information and health information of the user, which have been input from the user information input unit.

6 Claims, 17 Drawing Sheets

(56) References Cited

U.S. PATENT DOCUMENTS

| | | | | |
|---|---|---|---|---|
| 2023/0125855 A1* | 4/2023 | Tsukamoto | .......... | A61G 7/1092<br>5/86.1 |

FOREIGN PATENT DOCUMENTS

| | | | | |
|---|---|---|---|---|
| JP | 2017-136350 A | 8/2017 | | |
| JP | 2018-134430 | 8/2018 | | |
| WO | WO-2014122752 A1 * | 8/2014 | ............... | A61G 5/14 |
| WO | 2017/141372 | 8/2017 | | |

* cited by examiner

FIG.5
| | TRAJECTORY | |
|---|---|---|
| SITTING STATE | SITTING POSITION | 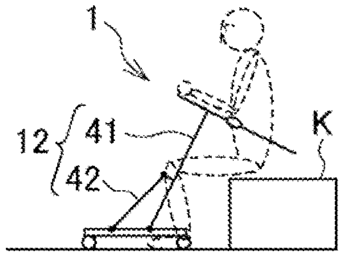 |
| FIRST PHASE P1 (BENDING PHASE) | SECTION F4A | 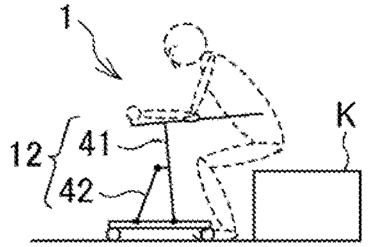 |
| SECOND PHASE P2 (SHIFTING PHASE) | SECTION F4B \| SECTION F4C | 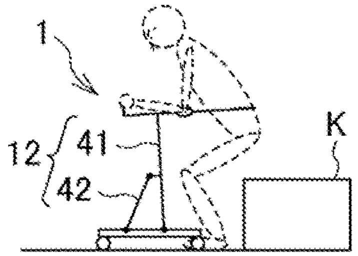 |
| THIRD PHASE P3 (EXTENSION PHASE) | | 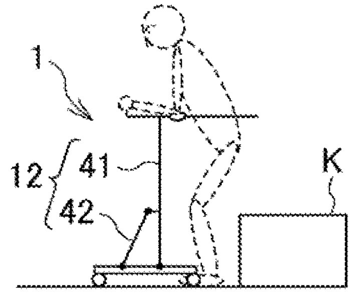 |
| STANDING STATE | STANDING POSITION | 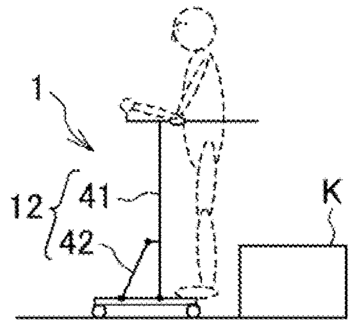 |

FIG.9

| | INPUT ITEMS | INPUT INFORMATION | SPEED | EXPLANATION |
|---|---|---|---|---|
| PHYSICAL INFORMATION | HEIGHT | HIGH | NORMAL | |
| | | LOW | NORMAL | |
| | CENTER OF GRAVITY | FRONT | NORMAL | |
| | | REAR | NORMAL | |
| | WEIGHT | HEAVY | SLOW | PERSON WITH HEAVY WEIGHT HAS DIFFICULTY SUPPORTING HIMSELF/HERSELF ONLY WITH LEGS AND HIPS, SO BENDING AND STRETCHING SPEED IS LOWERED |
| | | LIGHT | FAST | PERSON WITH LIGHT WEIGHT HAS LESS LOAD ON HIS/HER LEGS AND HIPS, SO BENDING AND STRETCHING SPEED IS RAISED |
| HEALTH INFORMATION | KNEE REGION | POOR | SLOW | FOR PERSON WITH KNEES IN POOR CONDITION, BENDING AND STRETCHING MOTION OF KNEES IS LOWERED. |
| | | NO PROBLEM | NORMAL (FAST) | FOR PERSON WITH KNEES IN GOOD CONDITION, SPEED OF DEVICE MAY BE RAISED ALSO FOR REHABILITATION. |
| | HIP REGION | POOR | SLOW | PERSON WITH LOWER BACK PAIN HAS A HARD TIME KEEPING HALF-SITTING POSTURE, SO SPEED OF DEVICE IS LOWERED. |
| | | NO PROBLEM | NORMAL (FAST) | FOR PERSON WITH HIPS IN GOOD CONDITION, SPEED OF DEVICE MAY BE RAISED ALSO FOR REHABILITATION. |

FIG.11

| | INPUT ITEMS | INPUT INFORMATION | SPEED | EXPLANATION |
|---|---|---|---|---|
| PHYSICAL INFORMATION | HEIGHT | HIGH | NORMAL | |
| | | LOW | NORMAL | |
| | CENTER OF GRAVITY | FRONT | NORMAL | |
| | | REAR | NORMAL | |
| | WEIGHT | HEAVY | SLOW | PERSON WITH HEAVY WEIGHT CANNOT SUPPORT SUDDEN WEIGHT TRANSFER, SO MOVING SPEED IS LOWERED |
| | | LIGHT | FAST | PERSON WITH LIGHT WEIGHT HAS LESS LOAD ON HIS/HER LEGS AND HIPS, SO BENDING AND STRETCHING SPEED IS RAISED |
| HEALTH INFORMATION | KNEE REGION | POOR | SLOW | FOR PERSON WITH KNEES IN POOR CONDITION, BENDING AND STRETCHING OF KNEES IS LOWERED |
| | | NO PROBLEM | NORMAL (FAST) | FOR PERSON WITH KNEES IN GOOD CONDITION, SPEED OF DEVICE MAY BE RAISED ALSO FOR REHABILITATION. |
| | HIP REGION | POOR | SLOW | PERSON WITH LOWER BACK PAIN HAS DIFFICULTY BENDING AND STRETCHING SUDDENLY, SO SPEED OF DEVICE IS LOWERED |
| | | NO PROBLEM | NORMAL (FAST) | FOR PERSON WITH HIPS IN GOOD CONDITION, SPEED OF DEVICE MAY BE RAISED ALSO FOR REHABILITATION. |

FIG.15

| | INPUT ITEMS | INPUT INFORMATION | TRAJECTORY | EXPLANATION |
|---|---|---|---|---|
| PHYSICAL INFORMATION | HEIGHT | HIGH | STANDING-UP POSITION = HIGH | STANDING-UP POSITION IS RAISED ACCORDING TO HEIGHT. EXPANSION LENGTH OF SHAFT PORTION IS LONG |
| | | LOW | STANDING-UP POSITION = LOW | STANDING-UP POSITION IS LOWERED ACCORDING TO HEIGHT. EXPANSION LENGTH OF SHAFT PORTION IS SHORT |
| | CENTER OF GRAVITY | FRONT | STANDING-UP POSITION = FRONT | FOR PERSON WHO USUALLY USES A CANE OR HAS A BENT WAIST, SUPPORT POSITION IS MADE CLOSER TO FRONT WHEN STANDING UP IS COMPLETED |
| | | REAR | STANDING-UP POSITION = REAR | FOR PERSON WITH POSTURE BENDING BACKWARD, SUPPORT POSITION IS MADE CLOSER TO BACK WHEN STANDING UP IS COMPLETED |
| | WEIGHT | HEAVY | DEEPLY INCLINING FORWARD | PERSON WITH HEAVY WEIGHT HAS DIFFICULTY SUPPORTING HIMSELF/HERSELF ONLY WITH HIS/HER LEGS AND HIPS, SO BENDING AND STRETCHING SPEED IS LOWERED |
| | | LIGHT | NORMAL | |
| HEALTH INFORMATION | KNEE REGION | POOR | DEEPLY INCLINING FORWARD | FOR PERSON WITH KNEES IN POOR CONDITION, DEEP FORWARD INCLINATION DISPERSES LOAD TO ARMS TO REDUCE LOAD ON LEGS |
| | | NO PROBLEM | NORMAL | |
| | HIP REGION | POOR | STANDING-UP POSITION = HIGH | PERSON WITH LOWER BACK PAIN HAS A HARD TIME KEEPING HALF-SITTING POSTURE, SO STANDING-UP POSITION IS RAISED. |
| | | NO PROBLEM | NORMAL | |

FIG.17

| | INPUT ITEMS | INPUT INFORMATION | TRAJECTORY | EXPLANATION |
|---|---|---|---|---|
| PHYSICAL INFORMATION | HEIGHT | HIGH | STANDING-UP POSITION = HIGH | POSITION OF SUPPORT PORTION IN SITTING DOWN IS RAISED ACCORDING TO HEIGHT |
| | | LOW | STANDING-UP POSITION = LOW | POSITION OF SUPPORT PORTION IN SITTING DOWN IS LOWERED ACCORDING TO HEIGHT |
| | CENTER OF GRAVITY | FRONT | NORMAL | |
| | | REAR | NORMAL | |
| | WEIGHT | HEAVY | NORMAL | |
| | | LIGHT | NORMAL | |
| HEALTH INFORMATION | KNEE REGION | POOR | NORMAL (INCLINING FORWARD) | FOR PERSON WITH KNEES IN POOR CONDITION, DEEP FORWARD INCLINATION MAY BE USED TO DISPERSE LOAD TO ARMS TO REDUCE LOAD ON LEGS |
| | | NO PROBLEM | NORMAL | |
| | HIP REGION | POOR | SITTING POSITION = LOW | PERSON WITH LOWER BACK PAIN HAS A HARD TIME KEEPING HALF-SITTING POSTURE, SO STANDING-UP POSITION IS RAISED |
| | | NO PROBLEM | NORMAL | |

STANDING-UP ASSIST DEVICE

INCORPORATION BY REFERENCE

The present application claims priority under 35 U.S.C. § 119 to Japanese Patent Application No. 2021-173448 filed on Oct. 22, 2021. The content of the application is incorporated herein by reference in its entirety.

BACKGROUND OF THE INVENTION

Field of the Invention

The present invention relates to a standing-up assist device.

Description of the Related Art

A user with weak knees, legs and hips needs a great deal of effort to stand up from a state of sitting on a sitting chair by himself/herself, which puts a heavy load on the body. Accordingly, devices for assisting in standing up from sitting chairs have been proposed. Japanese Patent Laid-Open No. 2018-134430 and International Publication No. WO 2017-141372A disclose a device, as a device in this category, including a base portion and a shaft portion that is expandable and contractible in an up-down direction with respect to the base portion, in which a member gripped by the user or a member holding the user is arranged on the upper side of the shaft portion, and the shaft portion is expanded and contracted to assist the user in standing up.

However, it is desirable to perform assisting operations according to the individual conditions of the body and health of a user.

An object of the present invention is to provide a standing-up assist device for assisting in standing up according to individual conditions of a user.

SUMMARY OF THE INVENTION

One aspect of the present invention is a standing-up assist device including: a base portion; a shaft portion, having one end connected to the base portion, capable of moving at least up and down; a support portion provided at another end of the shaft portion; a control unit for controlling movement of the shaft portion; and a user information input unit to which information of a user is input, wherein, when a speed at which the support portion moves when the user is standing up is defined as a first moving speed, the control unit changes the first moving speed according to at least any of physical information and health information of the user, the information having been input from the user information input unit.

The one aspect of the present invention makes it possible to assist in standing up according to the individual conditions of the user.

BRIEF DESCRIPTION OF THE DRAWINGS

FIG. 5 is a diagram schematically showing operations of the standing-up assist device;

FIG. 9 is an explanation of speed control in standing-up assist operations;

FIG. 11 is an explanation of speed control in sitting-down assist operations;

FIG. 15 is an explanation of a trajectory control in standing-up assist operations;

FIG. 17 is an explanation of trajectory control in sitting-down assist operations.

DETAILED DESCRIPTION OF THE PREFERRED EMBODIMENTS

First Embodiment

A first embodiment of the present invention will now be described with reference to the drawings.

Figure 1:
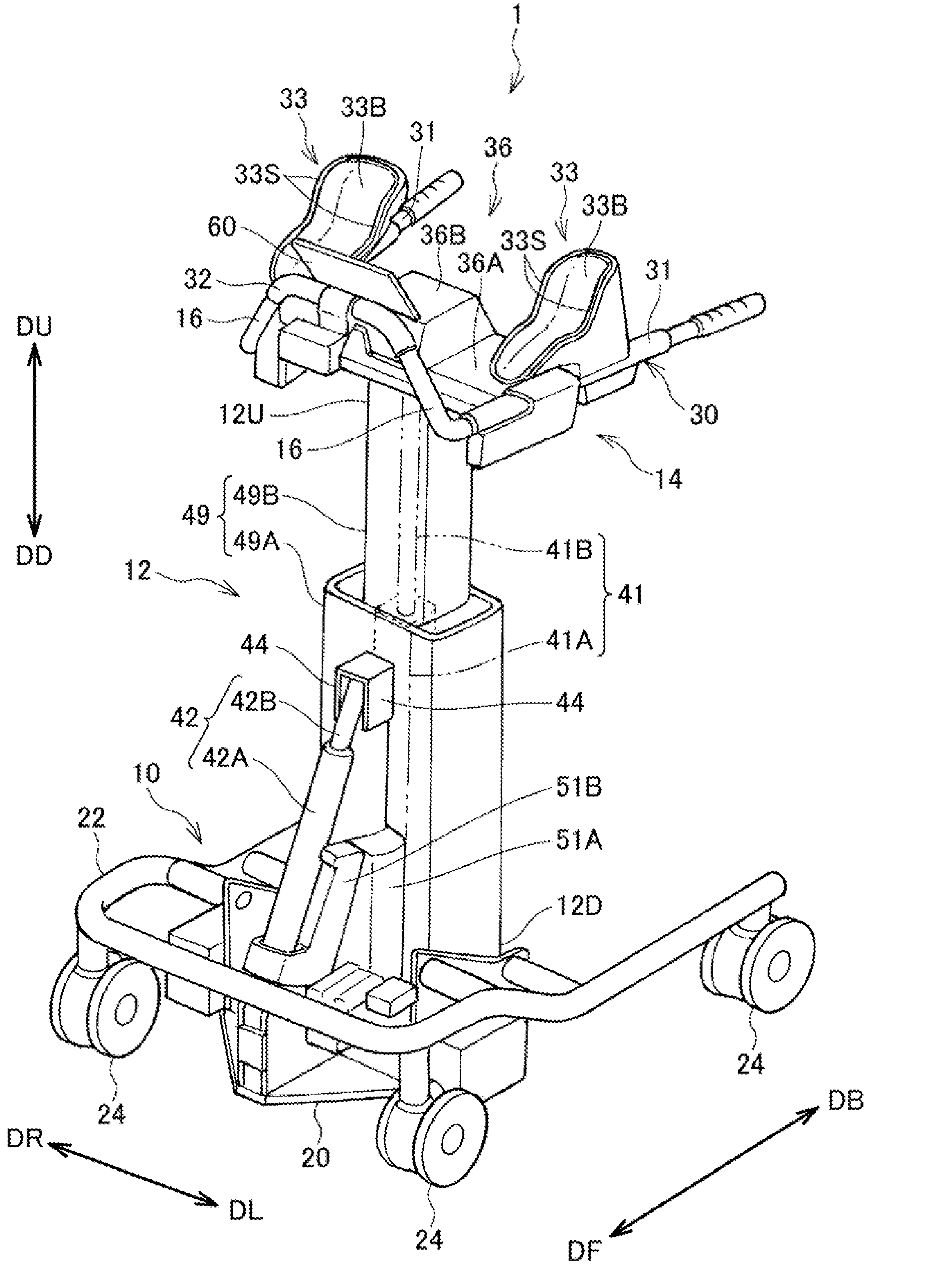
FIG. 1 is a perspective view showing an overall configuration of a standing-up assist device.

FIG. 1 is a perspective view showing an overall configuration of a standing-up assist device 1 according to the present embodiment.

Figure 3:
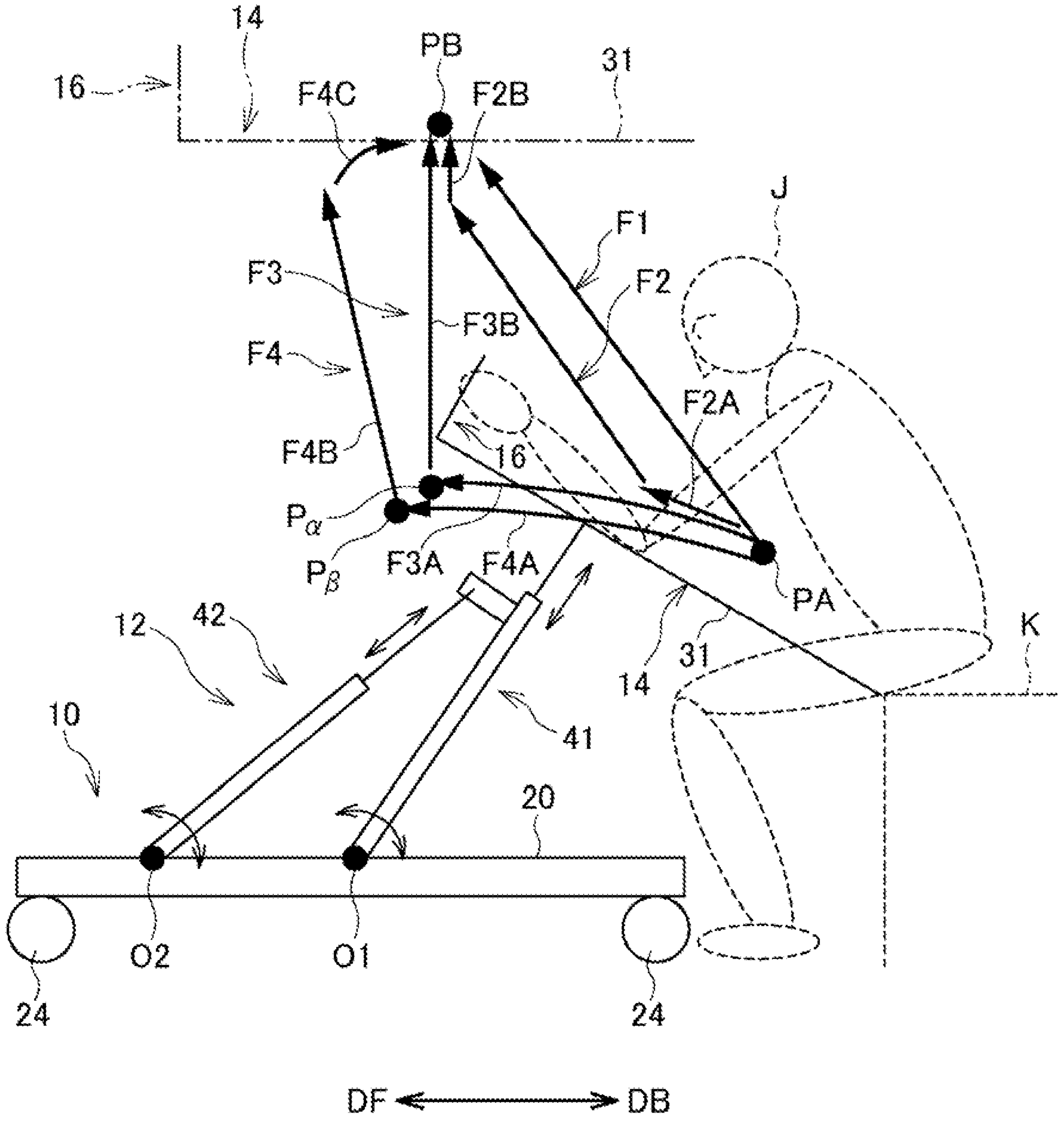
FIG. 3 is a diagram schematically showing a trajectory of a support portion when a shaft portion of the standing-up assist device moves.

The standing-up assist device 1 is a device for assisting standing-up motion and sitting-down motion of a user J (see FIG. 3). The standing-up motion represents a motion in which the user J keeps the direction of the body and stands up from a sitting state, in which the user J sits on a seat K (see FIG. 3) such as a chair or a bed, to a standing state, in which the user stands up. The sitting-down motion represents a motion in which the user J keeps the direction of the body and lower the hips to sit down on the seat K to shift from the standing state to the sitting state.

In the following description, the direction in which the user J in the sitting state stands up in the standing-up motion is referred to as a front direction DF, and the direction in which the user J in the standing state moves the hips (buttocks) in the sitting-down motion is referred to as a rear direction DB. Of the directions orthogonal to the front direction DF and the rear direction DB, the side where the left hand of the user J facing the front direction DF is located is referred to as the left direction DL, and the side where the right hand of the user J is located is referred to as the right direction DR. The upward direction in the vertical direction is referred to as an upward direction DU, and the downward direction in the vertical direction is referred to as a downward direction DD.

In addition, the movement of the body when a healthy person who does not need assist performs a standing-up motion and a sitting-down motion is referred to as a “natural motion”.

The standing-up assist device 1 of the present embodiment includes a configuration for assisting the user J to perform a standing-up motion and a sitting-down motion with a motion close to the natural motion. Since the user J performs standing-up motion and sitting-down motion with a movement close to the natural motion, he/she can stand up and sit down by appropriately using his/her own power without overly relying on assist.

The structural configuration of the standing-up assist device 1 will now be described.

FIG. 1 is a perspective view showing an overall configuration of a standing-up assist device 1.

As shown in the figure, the standing-up assist device 1 includes a base portion 10, a shaft portion 12, a support portion 14, and grip portions 16.

The base portion 10 corresponds to the base part of the structure (skeleton) of the standing-up assist device 1, and includes a base plate 20 that is a main frame on which the shaft portion 12 is erected. Further, the base portion 10 of the present embodiment includes: a pipe frame 22 having a substantially C-shape in a plan view and an opening in the rear direction DB; and wheels 24 movably supporting the pipe frame 22, and the base plate 20 is supported by the pipe frame 22 inside the pipe frame 22. Wheels 24 are provided on the left and right of the front end of the pipe frame 22 and the other wheels 24 are provided on the left and right of the rear end thereof, contributing to stably balancing the standing-up assist device 1 in the front-rear direction and the left-right direction. Since the respective wheels 24 are casters that can move in any direction, and the standing-up assist device 1 includes such wheels 24, the standing-up assist device 1 moves according to the walking of the user J in the standing state, and can be used for a device called a walk assist device.

The shaft portion 12 is a part having a shape extending from the base portion 10 in the upward direction DU, the lower end portion 12D thereof is coupled to the base plate 20 of the base portion 10, and the upper end portion 12U thereof is fixed to the support portion 14. In other words, the shaft portion 12 also functions as a part supporting the support portion 14 in the upward direction DU of the base portion 10. The shaft portion 12 is turnable in the front-rear direction around the lower end portion 12D and is expandable and contractible in an up-down direction, whereby the support portion 14 can be moved in both the front-rear direction and the up-down direction. The configuration of the shaft portion 12 is to be described below.

The support portion 14 is a part supporting the body of the user J, and the support portion 14 of the present embodiment includes a rod-shaped member 30 having a substantially C-shape in a plan view and an opening in the rear direction DB. Specifically, the rod-shaped member 30 has a pair of left and right elbow contact portions 31 extending in the front-rear direction, and a connecting portion 32 connecting the front end portions of the respective elbow contact portions 31. Each elbow contact portion 31 is a part for supporting the elbow of the user J, and is provided with a cup-shaped elbow contact support member 33 into which the elbow is fitted. The elbow contact support member 33 has a pair of left and right side walls 33S and a rear wall 33B located in the rear direction DB of the elbow, the side walls 33S prevent the elbow from moving in the left-right direction, and the rear wall 33B supports the elbow from the rear direction DB.

Further, the support portion 14 is provided with a pair of the left and right grip portions 16 that are parts to be gripped by the user J by hand. In the present embodiment, the grip portions 16 are integrated with the rod-shaped members 30 constituting the support portion 14. Specifically, the rod-shaped members 30 each have a part bent upward at the front end portion of each of the left and right elbow contact portions 31, and these parts constitutes the grip portions 16.

Note that members each having a shape that can be gripped by the user J (for example, a rod-shaped members) may be erected on the respective elbow contact portions 31 to form grip portions 16 separately from the rod-shaped members 30 constituting the support portion 14. Further, the mounting positions of the elbow contact support members 33 may be configured to be adjustable in the front-rear direction according to the length from the hand to the elbow of the user J. As a result, the user J can adjust the mounting positions of the elbow contact support members 33 so that he/she can always grip the grip portions 16 while putting the elbows in the elbow contact support members 33.

Further, the support portion 14 is provided with a chest contact support portion 36 between a pair of the left and right elbow contact portions 31. The chest contact support portion 36 includes a plate material 36A installed between a pair of the left and right elbow contact portions 31 and a protruding chest contact material 36B fixed to substantially the center of the left and right sides of the plate material 36A, and substantially the entire chest contact support portion 36 including the chest contact material 36B is covered with a member having resilience such as urethane foam. When the user J is in a standing state or in a forward-bent posture, he/she can press the chest against the chest contact support portion 36 to support the upper body.

Figure 2:
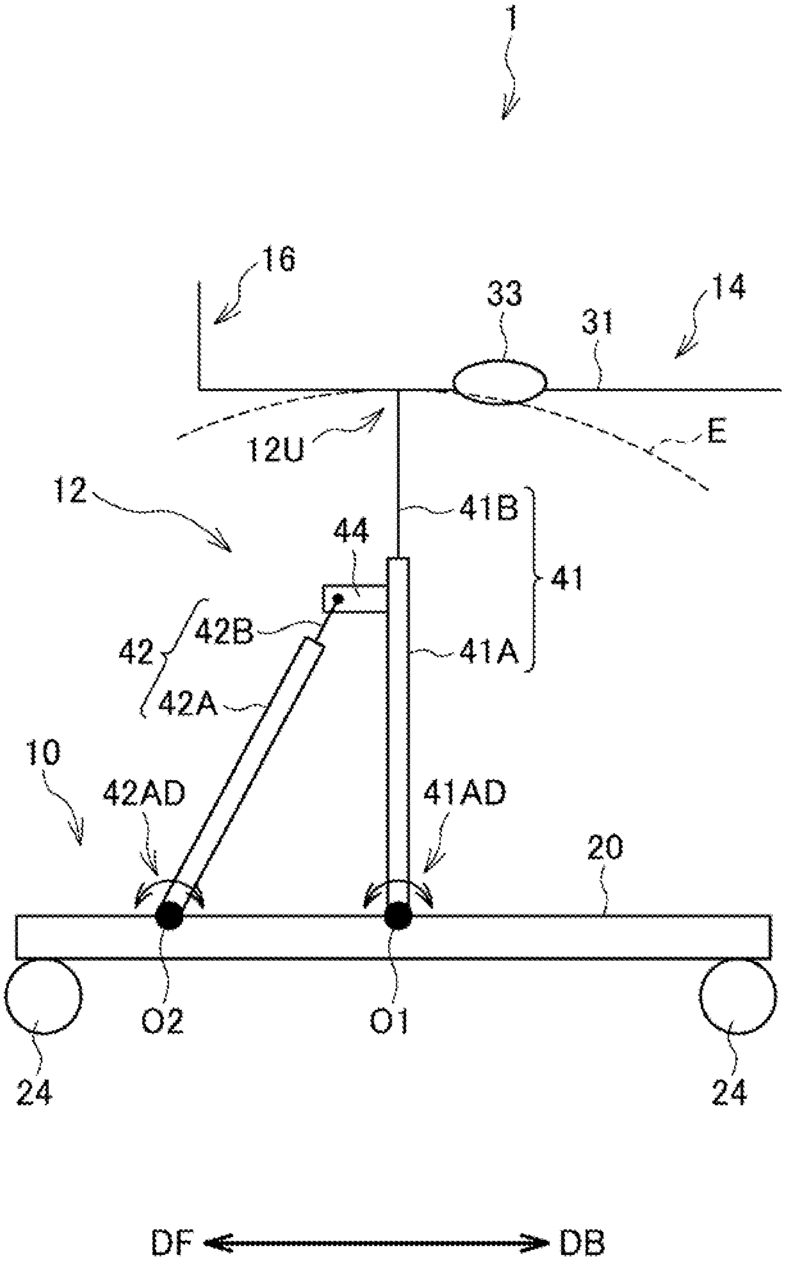
FIG. 2 is a diagram showing a movable mechanism of the standing-up assist device.

FIG. 2 is a diagram showing a movable mechanism of the standing-up assist device 1. Note that FIG. 2 is a schematic diagram, and the dimensions, shapes, and positions of the members are different from those in FIG. 1.

The shaft portion 12 of the standing-up assist device 1 includes a first shaft member 41 and a second shaft member 42, each of which is expandable and contractible in the up-down direction, and has a lower end portion coupled to the base portion 10. In the present embodiment, the first shaft member 41: includes an outer cylinder 41A having a hollow cylindrical shape, and a rod 41B housed coaxially with and linearly movably in the outer cylinder 41A; and has a linear motion device that expands and contracts as a whole when the rod 41B linearly moves back and forth. Similarly, the second shaft member 42: includes an outer cylinder 42A having a hollow cylindrical shape and a rod 42B housed coaxially with and linearly movably in the outer cylinder 42A; and has a linear motion device that expands and contracts as a whole when the rod 42B linearly moves back and forth. In the present embodiment, these linear motion devices each use an electric cylinder having a ball screw and a motor for driving the ball screw to rotate. The movement in assisting the standing-up motion and the movement in assisting the sitting-down motion, which is a movement substantially opposite to the standing-up motion, are in a substantially forward-to-reverse relationship; and using a cylinder having a ball screw and a motor for the linear motion device makes it possible to easily implement the forward and reverse movement and to perform positioning and speed control. Here, the linear motion device can use a well-known or known mechanism having other configurations.

Figure 4:
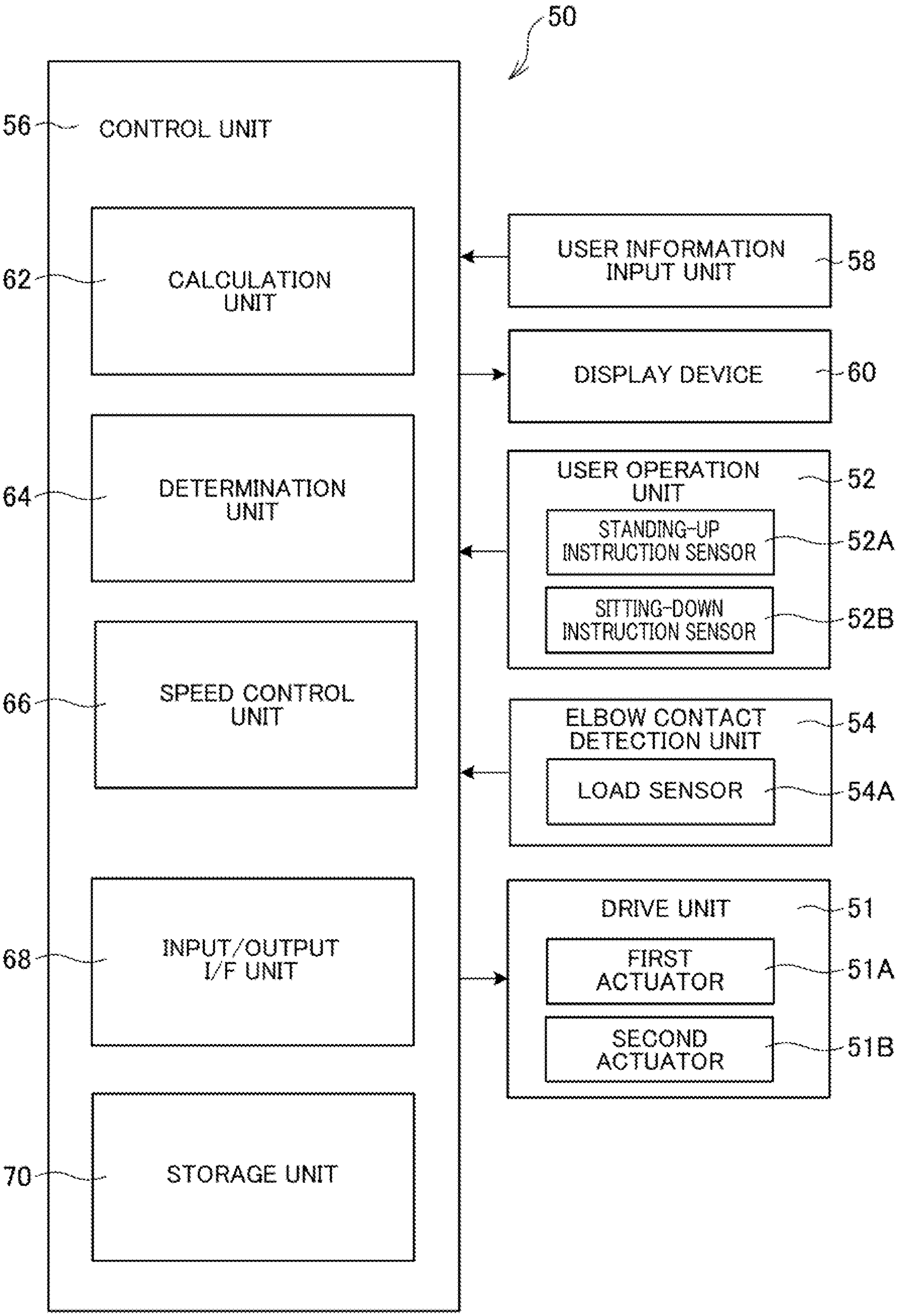
FIG. 4 is a block diagram showing a functional configuration of a control system for a standing-up assist device according to a first embodiment.

The first shaft member 41 and the second shaft member 42 are arranged side by side in the front-rear direction; the respective outer cylinders 41A and 42A are provided on the base portion 10 (base plate 20) so as to be turnable in the front-rear direction; and the first shaft member 41 and the second shaft member 42 are individually driven respectively by the first actuator 51A and the second actuator 51B (see FIGS. 1 and 4). In the present embodiment, the first shaft member 41 and the second shaft member 42 respectively have the lower end portion 41AD and 42AD each turnably and pivotally supported by the base portion 10, providing the turning shafts O1 and O2 for the respective turns at the lower end portions 41AD and 42AD.

Here, the end of the rod 41B of the first shaft member 41 corresponds to the upper end portion 12U of the shaft portion 12, and the support portion 14 is fixed to the end. As a result, the support portion 14 moves along an arc E centered on the turning shaft O1 with the turn of the first shaft member 41 at the height position supported by the first shaft member 41. The length of the arc E increases in proportion to the length (height) of the first shaft member 41 which is the turning radius. This configuration can make the movable range of the support portion 14 greater than, for example, configurations as in the above Patent Literature 1 and Patent Literature 2 in which a support portion is turnably supported by an end of a shaft portion erected on a base portion so as not to be turnable.

Further, the fixing point (upper end portion 12U of the shaft portion 12) between the support portion 14 and the first shaft member 41 is fixed by fastening means such as welding, bolts, or screws, so that the support portion 14 is not turnable with respect to the shaft portion 12. This can prevent the user from injury on his/her wrist caused in such a way that the support portion 14 unintentionally turns with respect to the shaft portion 12 while the user grips the grip portions 16, and the force of the turn acts on the user's wrist.

The second shaft member 42 has a rod 42B, an end of which is turnably coupled to the outer cylinder 41A, which is a non-movable portion of the first shaft member 41. Specifically, as shown in FIG. 1 above, the outer cylinder 41A of the first shaft member 41 is provided with a pair of left and right plate-shaped coupling pieces 44; and as shown in FIG. 2, the end of the rod 42B of the second shaft member 42 is pivotally supported by the coupling pieces 44 with a pin or the like. This causes the end to passively turn according to the turn, and expansion and contraction of the first shaft member 41 and the second shaft member 42.

In the present embodiment, as shown in FIG. 1 above, the standing-up assist device 1 includes a cover member 49 covering the entire circumference of the first shaft member 41 to improve the sense of stability and prevent looseness; and the second shaft member 42 is coupled to the first shaft member 41 via the cover member 49. Specifically, the cover member 49 internally includes the outer cylinder 41A of the first shaft member 41, and includes a first cover member 49A that is immovable with respect to the outer cylinder 41A and a second cover member 49B that internally includes the rod 41B. The first cover member 49A has the coupling pieces 44 to which the end of the rod 42B of the second shaft member 42 is coupled.

FIG. 3 is a diagram schematically showing a trajectory of the support portion 14 when the shaft portion 12 of the standing-up assist device 1 moves.

In the standing-up assist device 1, the first shaft member 41 turns on the turning shaft O1 at the lower end portion 41AD and expands and contracts in the up-down direction, so that the support portion 14 is movable in various trajectories between a position PA corresponding to the user J in the sitting posture (hereinafter referred to as a sitting position) and a position PB corresponding to the user J in the standing posture (hereinafter referred to as a standing position). As shown in FIG. 3, such trajectories include a first trajectory F1, a second trajectory F2, a third trajectory F3, and a fourth trajectory F4.

The first trajectory F1 is a trajectory diagonally and linearly connecting the sitting position PA and the standing position PB.

The second trajectory F2 is a trajectory in which the first trajectory F1, diagonally linearly extending, additionally includes a section F2A extending to the front F1 at the start of the standing-up motion, and a section F2B extending straight up at the end of the standing-up motion.

The third trajectory F3 is different from the first trajectory F1 and the second trajectory F2, and is a trajectory hardly including a trajectory extending linearly in the diagonal direction. In other words, the third trajectory F3 is a trajectory consisting of a section F3A extending from the sitting position PA to a position Pα directly under the standing position PB and a section F3B extending from the position Pα directly thereunder to the standing position PB right above.

The fourth trajectory F4 is a trajectory consisting of: a section F4A extending in the front direction DF from the sitting position PA to a predetermined front end position Pβ beyond the position Pα directly under the standing position PB; a section F4B linearly extending diagonally upward and forward from the predetermined front end position Pβ; and a section F4C extending from the upper end of the moving trajectory F4 to the standing position PB.

The fourth trajectory F4 is a trajectory corresponding to the above natural motion, and the relationship between the fourth trajectory F4 and the natural motion is to be described below.

FIG. 4 is a block diagram showing a functional configuration of a control system 50 related to the movement of the standing-up assist device 1.

The standing-up assist device 1 includes a drive unit 51, a user operation unit 52, an elbow contact detection unit 54, a control unit 56, a user information input unit 58, and a display device 60.

The drive unit 51 drives the shaft portion 12 to rotate, expand and contract, and includes the first actuator 51A and the second actuator 51B, which are drive sources for the first shaft member 41 and the second shaft member 42, respectively. As shown in FIG. 1 above, the first actuator 51A and the second actuator 51B are arranged at the lower end portions 41AD and 42AD of the first shaft member 41 and the second shaft member 42, respectively. This lowers the center of gravity of the standing-up assist device 1, and improves the stability. Note that the first actuator 51A and the second actuator 51B can be arranged anywhere, for example, at a position near the lower end portions 41AD and 42BD as long as the actuators are closer to the lower end portions 41AD and 42AD of the first shaft member 41 and the second shaft member 42, respectively, and the position is a position to lower the center of gravity.

The user operation unit 52 is a part that the user J operates to receive assist for the standing-up motion and the sitting-down motion, and includes an operation detection device for receiving the operation and outputting the operation to the control unit 56. In the present embodiment, the operation detection device of the user operation unit 52 includes: momentary switches, which is an example of an operation input device, for operation input for receiving assist for standing-up motion and operation input for receiving assist for sitting-down motion; and a standing-up instruction sensor 52A and a sitting-down instruction sensor 52B for detecting the operation input of each momentary switch. In the present embodiment, both the momentary switches are disposed on the support portion 14. Specifically, the grip portion 16 on the right hand side is provided with a momentary switch corresponding to assisting the standing-up motion, and the grip portion 16 on the left hand side is provided with the momentary switch corresponding to assisting the sitting-down motion.

The elbow contact detection unit 54: detects that the user J is ready to receive assist in a standing-up motion or a sitting-down motion when he/she takes a posture in which he/she sufficiently presses the elbow against the elbow contact support member 33, based on the load applied to the elbow contact support member 33; includes a load sensor 54A arranged on the elbow contact support member 33; and outputs the detection information to the control unit 56.

The control unit 56 controls the drive unit 51 according to the operation of the user J on the user operation unit 52. Specifically, the control unit 56 controls the drive unit 51 to move the support portion 14 from the sitting position PA to the standing position PB when the standing-up instruction sensor 52A detects the standing-up instruction. Further, the control unit 56 controls the drive unit 51 to move the support portion 14 from the standing position PB to the sitting position PA when the sitting-down instruction sensor 52A detects the sitting-down instruction. However, when the control unit 56 determines that the predetermined load is not applied to the elbow contact support member 33 and the user J does not sufficiently press the elbow against the elbow contact support member 33, based on the detection information of the elbow contact detection unit 54, the control unit 56 does not drive the drive unit 51 if the user operation unit 52 is operated. This can prevent an event such that, in a state in which the user J is not in a posture to receive assist for the standing-up motion or the sitting-down motion, the support portion 14 moves so that only the hand of the user J who grips the grip portion 16 is drawn to the movement of the support portion 14 and the torso cannot keep up with the movement (for example, in assisting the standing-up motion, the torso remains on the side of the seat K).

The control unit 56: have a computer including a processor such as a CPU or MPU, a memory device such as a ROM or RAM, a storage unit 70 having a storage device such as an HDD or SSD, and an input/output interface I/F unit 68 for connecting sensors and peripheral devices; and implements various functions by the processor executing computer programs stored in a memory device or a storage device.

The CPU executes a program stored in the storage unit 70 or the like to implement: the function of a calculation unit 62 for performing various calculations; the function of a determination unit 64 for making a determination in control; and the function of a speed control unit 66 for controlling the moving speed of the drive unit 51.

The standing-up assist device 1 is provided with a display device 60 (see FIG. 1) for displaying various information to present it to the user J, and a user information input unit 58 for inputting various information to the control unit 56. The display device 60 is a display device such as a liquid crystal panel or an organic EL panel. The user information input unit 58 is a touch panel screen provided on the surface of the display device 60. The user information input unit 58 and the display device 60 may be independent devices from the standing-up assist device 1 itself, and be connected to the control unit 56 by a wired or wireless communication means. A device called smartphone or tablet PC may be fixed to the support portion 14 of the standing-up assist device 1, as the user information input unit 58 and the display device 60.

Here, in the standing-up assist device 1 of the present embodiment, when the user J instructs assist in the standing-up motion and the sitting-down motion, the control unit 56, in any of the instructions, controls the drive unit 51 (each of the first actuator 51A and the second actuator 51B) to move the support portion 14 along the fourth trajectory F4, to assist the movement so that the user J stands up or sits down with a movement close to the natural motion.

FIG. 5 is a diagram schematically showing a correspondence between the movement of a healthy person who does not need assist in standing up and the fourth trajectory F4. When a healthy person sits down, the movement thereof is almost the same as the movement rewinding the movement in standing up.

As shown in the same figure, the movement in standing up includes the following three phases while a healthy person shifts from the sitting state to the standing state: a first phase P1, a second phase P2, and a third phase P3. The first phase P1 is a phase (bending phase) in which a healthy person lifts his/her hips from the seat K and bends his/her body so as to bend forward, and moves his/her center of gravity toward the front direction DF. The second phase P2 is a phase (shifting phase) in which a healthy person raises his/her upper body. The third phase P3 is a phase (extension phase) in which a healthy person extends his/her knees, and legs and hips.

On the other hand, as shown in FIG. 3 above, the fourth trajectory F4 includes three sections F4A, F4B, and F4C. As shown in FIG. 5, the section F4A (first section) corresponds to the movement of the first phase P1, and the two sections (second section) of the sections F4B and F4C correspond to the movement of the second phase P2 and the third phase P3.

Specifically, as described above, the section F4A is: a trajectory in which the support portion 14 moves from the sitting position PA to the predetermined front end position Pβ in the front direction DF beyond the position Pα directly under the standing position PB; and a trajectory in which the support portion 14 moves according to the movement of the body when the user J bends forward in the first phase P1. In the present embodiment, the front end position of the section F4A is set to a position where the first shaft member 41 inclines toward the front direction DF at a predetermined angle between about 10 degrees and about 20 degrees with respect to the vertical direction.

Further, the two sections F4B and F4C are: trajectories in which the support portion 14 moves from the predetermined front end position Pβ to the standing position PB; and trajectories in which the support portion 14 moves according to the movement of the body when the user J raises the upper body and extends the knees and hips in the second phase P2 and the third phase P3.

In this way, the movement of the support portion 14 along the fourth trajectory F4 allows the user J to perform a standing-up motion and a sitting-down motion with a motion close to a natural motion, and thereby allows the user to stand up and sit down by using his/her own power moderately without overly relying on assist. This provides appropriate assist for users who need a relatively light assist.

Here, in FIG. 5, the contraction operation of the second shaft member 42 in the standing-up motion shifts the inclination of the entire shaft portion 12 from the first phase P1 (sitting state) to the second phase P2. This contraction speed is referred to as a first contraction speed. Next, the expansion operation of the first shaft member 41 shifts the second phase P2 to the fourth phase P4 (standing state). This expansion speed is referred to as a first expansion speed. The speed at which the support portion 14 moves from the first phase P1 to the fourth phase P4 in this series when the user J stands up is referred to as a first moving speed in this specification.

The control unit 56 changes the first moving speed according to at least any of physical information and health information of the user J, which has been input from the user information input unit 58.

The contraction operation of the first shaft member 41 in the sitting-down motion shifts the fourth phase P4 to the second phase P2. This contraction speed is referred to as a second contraction speed. Next, the expansion operation of the second shaft member 42 shifts the second phase P2 to the first phase P1. This expansion speed is referred to as a second expansion speed. In this specification, the speed at which the support portion 14 moves from the fourth phase P4 to the first phase P1 in this series when the user sits down is referred to as a second moving speed.

The control unit 56 changes the second moving speed according to at least one of the physical information and the health information of the user J input from the user information input unit 58.

The second moving speed is desirably slower than the first moving speed.

The second expansion speed may be slower than the first contraction speed. When the second expansion speed is made slower than the first contraction speed, the user J can sit down with a slower motion when he/she sits down. The first expansion speed may be slower than the second contraction speed. Avoiding a sudden change in speed in standing-up motion allows the user J to stand up more slowly.

Note that the control unit 56 may control to change the speed and the trajectory of the assisting operation between the first phase and the fourth phase according to the physical information and the health condition of the user J.

Figure 6:
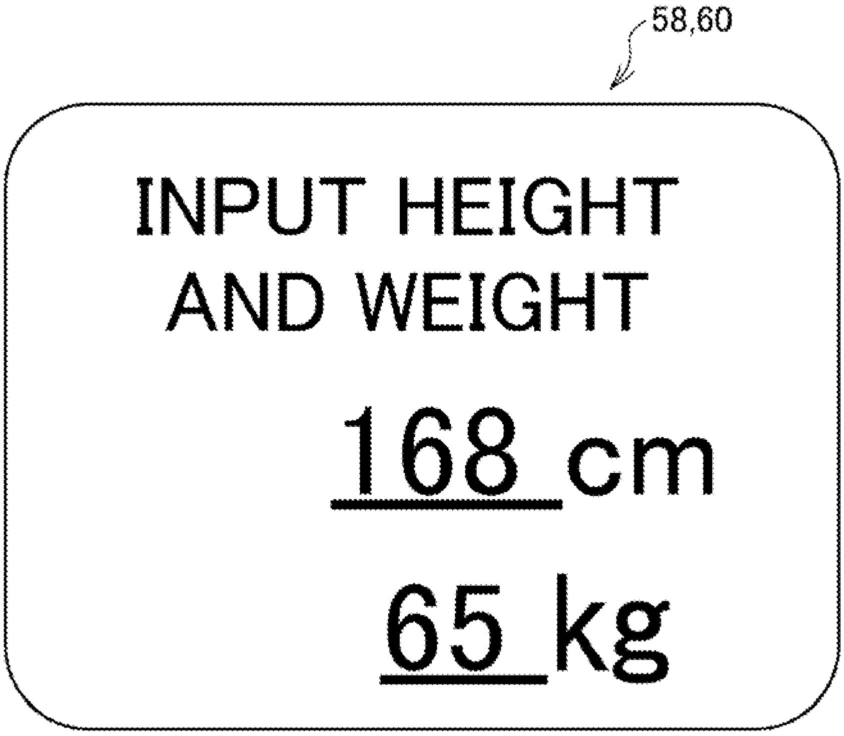
FIG. 6 is an example of a screen in which physical information has been input from a user information input unit.
Figure 7:
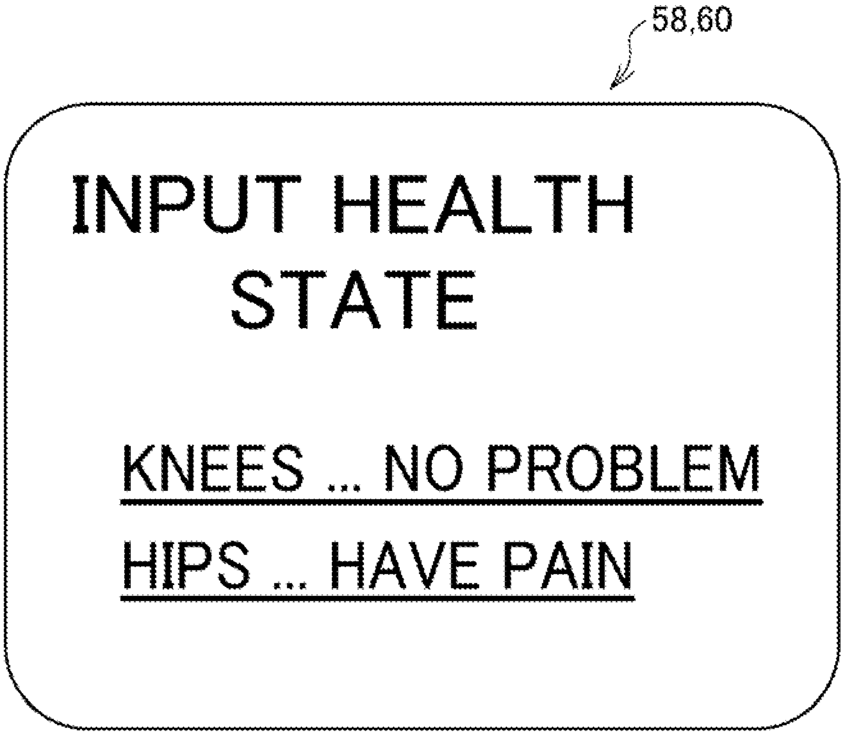
FIG. 7 is an example of a screen in which health information has been input from the user information input unit.

Examples of the user information input unit 58 are shown in FIGS. 6 and 7. First, the user information input unit 58 fixed to the upper side of the support portion 14 displays a screen for inputting the physical information of the user J (see FIG. 6). The physical information is information of the user J on, for example, at least any of height, weight, or a position of the center of gravity in standing up. The physical information may include information such as the size of the sitting height and the length of the arm. For example, FIG. 6 shows a screen on which the user J or his/her assistant can input the height and weight of the user J. For example, when the weight is heavy, the load for the user J himself to stand up by himself/herself may be large, so that the control unit 56 may control to lower the speed of the assisting operation.

In the user information input unit 58, a format may be used in which the absolute value of height and weight is input, or the height and weight are selected from a large category such as “high” and “low”, or “heavy” and “light”. Alternatively, for example, a method may be used in which a value applicable to the user J is selected from a table in increments of 10 cm for height and in increments of 5 kg for weight. Another format may be used in which the height is categorized into plus side and minus side based on average height, for example, 165 cm for men, and the category is input. Further, yet another format may be used in which the BMI value (Body Mass Index) is input instead of the weight itself.

For the center of gravity in standing up, selection of “front” or “back”, and whether to use the cane during normal walking may be input, and for a person who uses a cane, the center of gravity in standing up may be set to “front”.

A method for the user J to input information into the user information input unit 58 may be using a format in which an identification number associated with the user J is input. Specifically, for example, a format is used in which the identification number of the user J and the physical information are stored, in advance, in the storage unit 70 of the control unit 56 in association with each other, and the physical information is called from the storage unit 70 when the user J inputs the identification number into the user information input unit 58.

FIG. 7 shows an example of an input screen in which the user J inputs health information to the user information input unit 58. The health information is information on the state of a predetermined part in the body of the user J. The user J or his/her assistant input whether the function of each part of the body is fully exhibited using the user information input unit 58. The predetermined part in the body of the user J includes at least any of the hip region and knee region.

When the conditions of the knee region and hip region, which are considered to have a great influence on the standing-up motion, are such that the knee region has no problem and the hip region has a pain, for example, the user J inputs the health condition as shown in FIG. 7. Of course, for the health condition, a format may be used in which the identification number of the user J and the health information are stored in association with each other, and when the user J inputs the identification number into the user information input unit 58, the health information is called from the storage unit 70.

Figure 8:
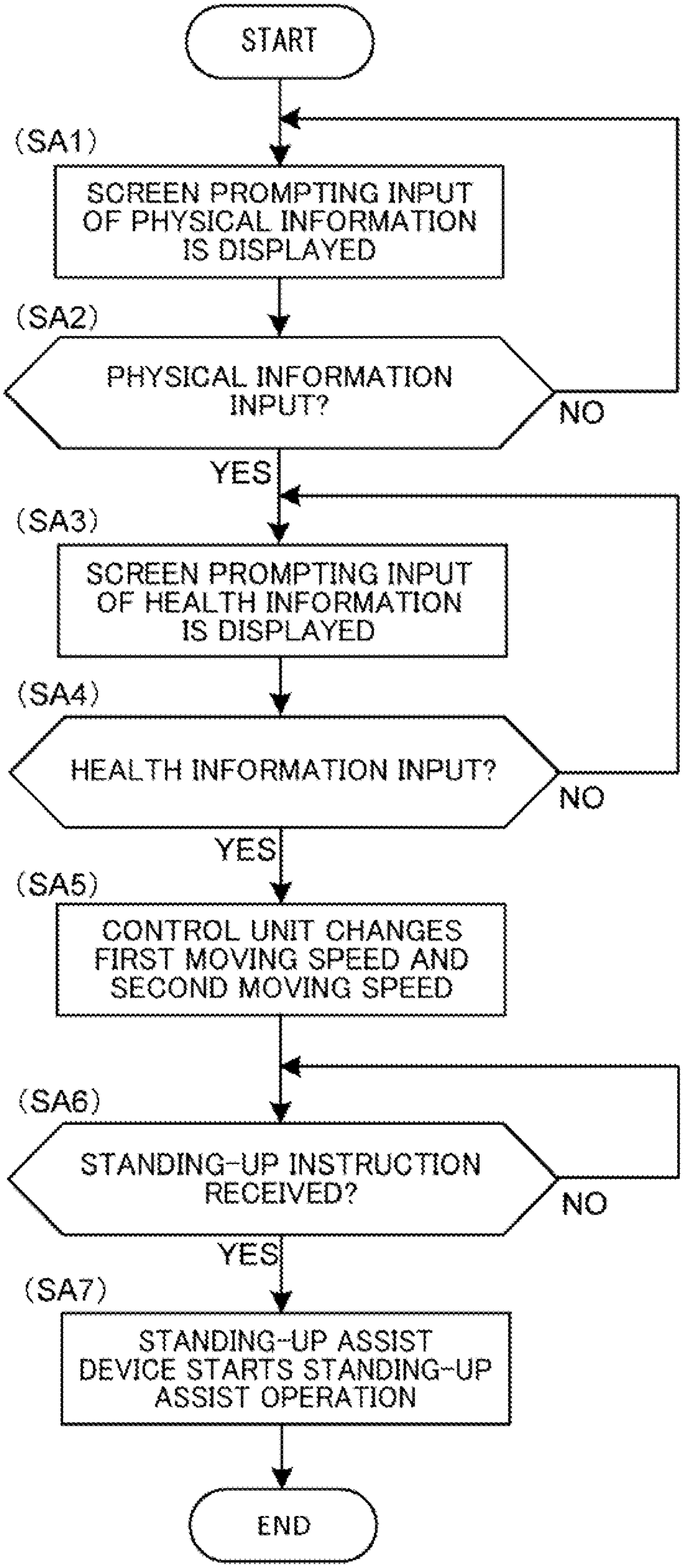
FIG. 8 is a flowchart showing operations of the standing-up assist device in standing-up motion.

FIG. 8 shows a flowchart for explaining the assist of the standing-up motion in the standing-up assist device 1 according to the first embodiment. The control unit 56 causes the display device 60 to display a screen prompting the input of physical information about the user J (step SA1). Here, the user J or his/her assistant may be able to input the identification number of the user J. If the determination unit 64 determines that the physical information has been input (step SA2: YES), the control unit 56 causes the display device 60 to display a screen prompting to input the health information (step SA3). If no physical information is input after a certain period of time, the process returns to step SA1. If the determination unit 64 determines that the health information has been input (step SA4: YES), the control unit 56 changes the moving speed of the support portion 14 and the shaft portion 12 based on at least any of the physical information and the health information, which has been input (step SA5). Specifically, the calculation unit 62 changes at least any of the first speed, the second speed, and the like from the first phase P1 to the fourth phase P4 based on at least one of the physical information and the health information (Step SA5). If the determination unit 64 determines that the health information has not been input (step SA4: NO), the process returns to step SA3. If the control unit 56 receives a signal indicating a standing-up instruction from the standing-up instruction sensor 52A (step SA6: YES), the standing-up assist device 1 starts a standing-up assisting operation for the user J (step SA7). If the control unit 56 does not receive the signal indicating the standing-up instruction from the standing-up instruction sensor 52A (step SA6: NO), the standing-up assist device 1 does not operate and goes into a waiting state.

FIG. 9 shows an example of how the control unit 56 controls the speed of the standing-up assist device 1 to perform the standing-up assisting operation for the physical information and health information, which has been input. A user J having heavy weight has difficulty standing-up motion. Therefore, the control unit 56 may lower its moving speed (first moving speed). On the other hand, when the weight of the user J is lighter than the normal, the speed control unit 66 may raise the first moving speed. Further, when the knee region or hip region of the user J are not good in the health condition, the speed control unit 66 may lower the first moving speed to avoid a sudden movement. Of course, the above first contraction speed and first expansion speed may be controlled independently. For example, the control may be such that the contraction speed is lowered at the beginning of the first contraction speed, then gradually raised, and the contraction speed is lowered again at the late stage of the contraction operation. The same applies to the first expansion speed.

Figure 10:
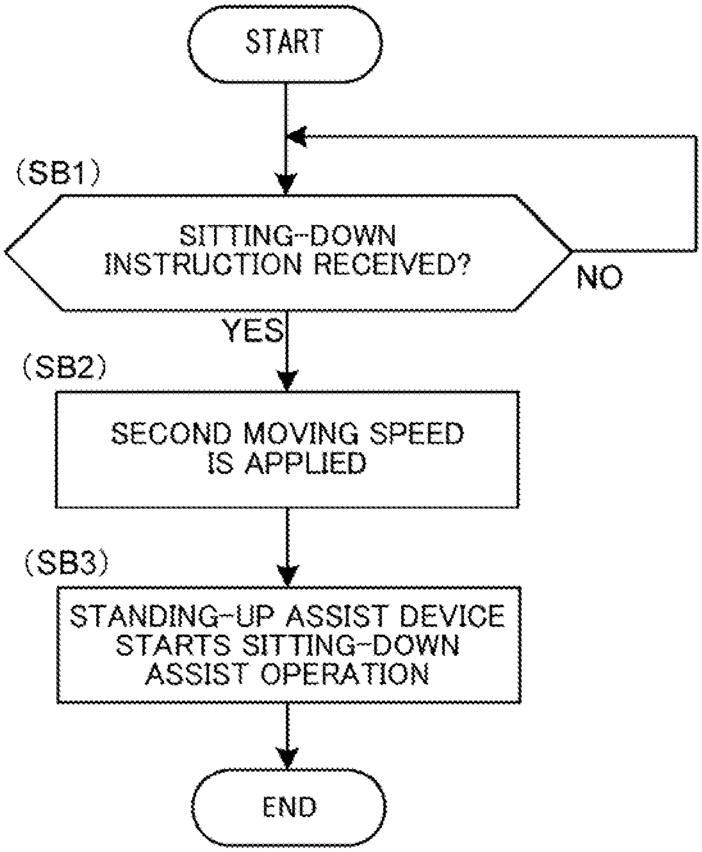
FIG. 10 is a flowchart showing operations of the standing-up assist device in sitting-down motion.

FIG. 10 shows a flowchart explaining the assist of the sitting-down motion when the user J sits down on the seat K. If the control unit 56 receives a signal indicating a sitting-down instruction from the sitting-down instruction sensor 52B (step SB1: YES), the speed control unit 66 applies the second moving speed (step SB2). Then, based on the control of the speed control unit 66, the standing-up assist device 1 starts sitting-down assist operation for the user J (step SB3). If the control unit 56 does not receive the signal indicating the sitting-down instruction, the process returns to step SB1.

FIG. 11 shows an example of the moving speeds at which the control unit 56 performs sitting-down assist control in the standing-up assist device 1 for the physical information and the health information input to the user information input unit 58. When the weight of the user J is heavy, the speed control unit 66 may lower the second moving speed because he/she cannot support the sudden weight transfer. On the contrary, for a person with light weight, the speed control unit 66 may perform assist control at a normal speed or assist control faster than the normal speed.

In addition, when the user information input unit 58 receives input health information indicating that the knee region and hip region are in poor condition, the user J may have difficulty bending and stretching, so that the second movement speed may be lowered. On the contrary, when the user information input unit 58 receives input indicating that the knee region and hip region are in good condition, the second moving speed may be raised from the viewpoint of rehabilitation. Of course, the above second contraction speed and second expansion speed may be controlled independently. For example, control may be such that the contraction speed is lowered at the beginning of the second contraction speed, then gradually raised, and the contraction speed is lowered again at the late stage of the contraction operation. The same applies to the second expansion speed.

Second Embodiment

Figure 12:
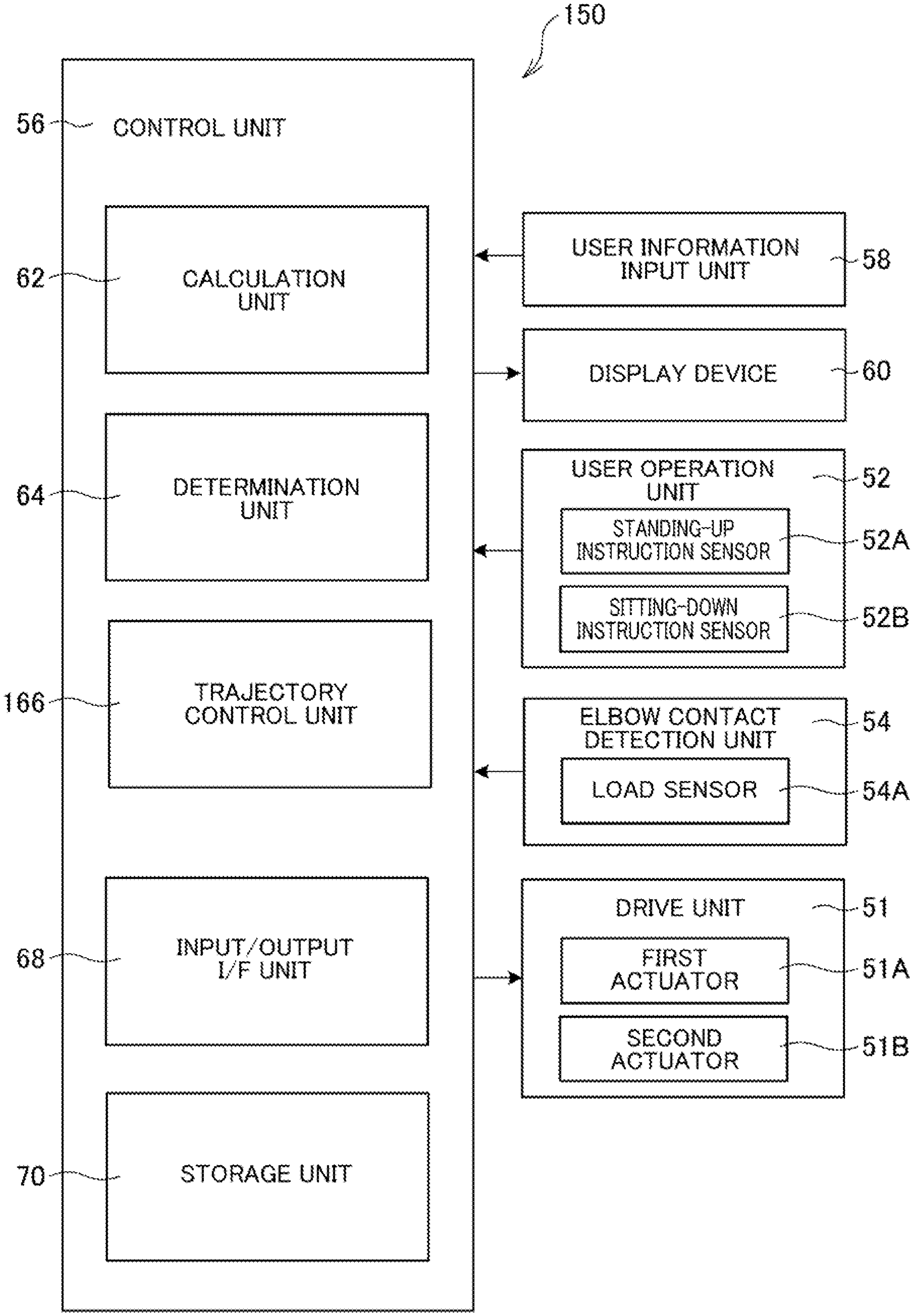
FIG. 12 is a block diagram showing a functional configuration of a control system for a standing-up assist device according to a second embodiment.

FIG. 12 is a block diagram showing a functional configuration of the control system 150 of the standing-up assist device 1 according to a second embodiment. The function implemented by the control unit 56 is different from that of the first embodiment in that the control unit 56 includes the trajectory control unit 166 for controlling the trajectory on which the support portion 14 and the like move, but the other configurations are the same. Therefore, detailed description of the configuration is omitted.

Figure 13:
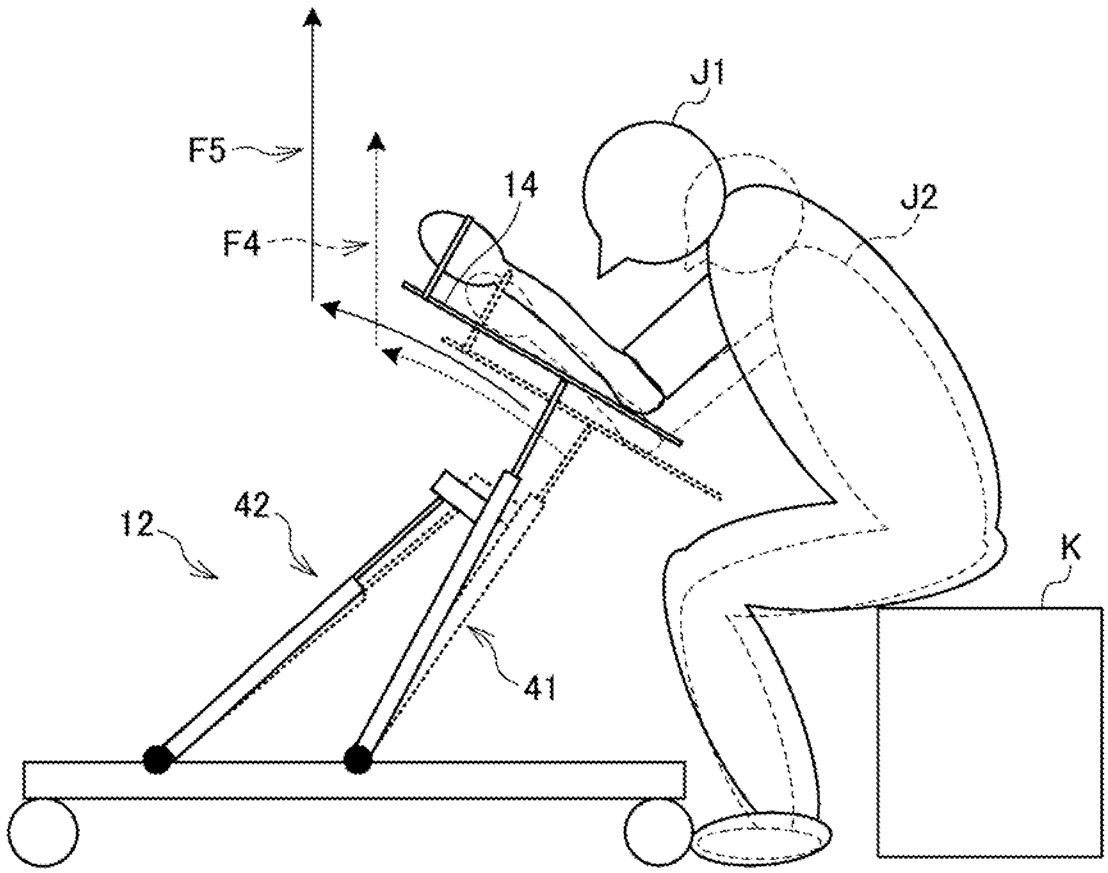
FIG. 13 is a diagram illustrating change in a support position, made by the standing-up assist device, depending on height.

FIG. 13 shows the change of the assisting operation according to the physical information of the user J. The user J1 having a large body size is shown by a solid line, and the user J2 having a small body size is shown by a dotted line. A solid line arrow shows an example of a trajectory F5 indicating how the standing-up assist device 1 performs a standing-up assisting operation when it receives input indicating that the height is high, the position of the center of gravity is in the front, and the weight is heavy, as physical information. In FIG. 13, a dotted line arrow shows an example of a trajectory F4 for assisting a person when the input indicates that the height is short, the position of the center of gravity is normal, and the weight is light.

Difference in the height, weight, or the position of the center of gravity of the user J differs the position of the support portion 14 and the moving trajectory suitable for supporting the weight on the arm in standing up. The control unit 56 changes the trajectory of the support portion 14 in, at least, any of standing up and sitting down according to the information on the state of a predetermined part in the body of the user J, which has been input from the user information input unit 58.

Figure 14:
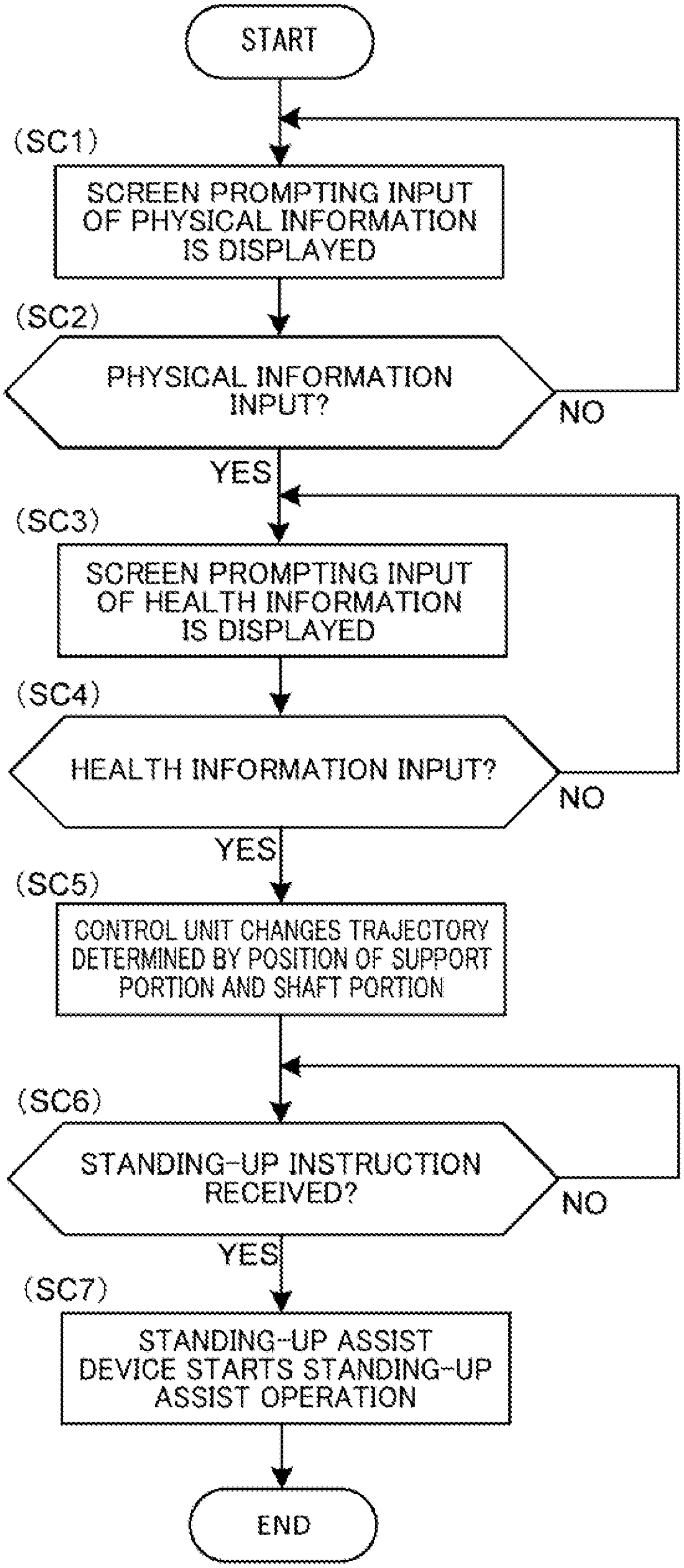
FIG. 14 is a flowchart showing operations of the standing-up assist device in standing-up motion.

FIG. 14 shows a flowchart for explaining assist of the standing-up motion in the standing-up assist device 1 according to the second embodiment. The control unit 56 displays, on the display device 60, a screen prompting the input of physical information about the user J (step SC1). Here, the user J or his/her assistant may be able to input the identification number of the user J. If the determination unit 64 determines that the physical information has been input (step SC2: YES), the control unit 56 displays, on the display device 60, a screen prompting the input of the health information (step SC3). If no physical information is input, the process returns to step SC1. If the determination unit 64 determines that the health information has been input (step SC4: YES), the calculation unit 62 in the control unit 56 changes the operation including trajectory of the support portion and the shaft portion from the first phase P1 to the fourth phase P4, based on at least any of the physical information and the health information, which has been input (Step SC5). If the determination unit 64 determines that the health information has not been input (step SC4: NO), the process returns to step SC3. If the control unit 56 receives a signal indicating a standing-up instruction from the standing-up instruction sensor 52A (step SC6: YES), the standing-up assist device 1 starts a standing-up assisting operation for the user J (step SC7). If the control unit 56 does not receive the signal indicating the standing-up instruction from the standing-up instruction sensor 52A (step SC6: NO), the standing-up assist device 1 does not operate and goes into a waiting state.

FIG. 15 shows an example of the position and trajectory of the support portion as a result of the standing-up assist control performed by the control unit 56 on the standing-up assist device 1 according to the physical information and health information, which have been input. When the user J is tall (for example, in the case of the solid line in FIG. 13), the control unit 56 controls to raise the height of the support portion 14. When the height of the user J is short (for example, in the case of the dotted line in FIG. 13), the control unit 56 controls to lower the height of the support portion 14.

For a person who usually uses a cane or has a bent waist, the position of the support portion when the standing up is completed is closer to the front. For a person with a posture bending backward, control is performed so that the support position when the standing up is completed is closer to the back.

For input from the user information input unit 58 indicating that the body weight is heavy, to reduce the load on the legs and hips when user J performs standing-up motion, the support portion 14 may be inclined to a deep angle to maintain a forward leaning posture so that the weight can be easily supported by the arms. Specifically, the contraction of the second shaft member 42 may be increased.

When the input for the health information indicates that there is a pain in knee region, the user J may be able to stand up more easily if he/she has a deep forward leaning posture. In such a case, the control unit 56 may incline the support portion 14 to a deep angle to be able to support a person with a forward leaning posture. Specifically, the contraction of the second shaft member 42 is increased.

When the input indicates that there is a pain in the hip region, the user J may have difficulty keeping a half-sitting posture and stretching the back muscles, and in that case, the control unit 56 controls to raise the position of the support portion 14.

Figure 16:
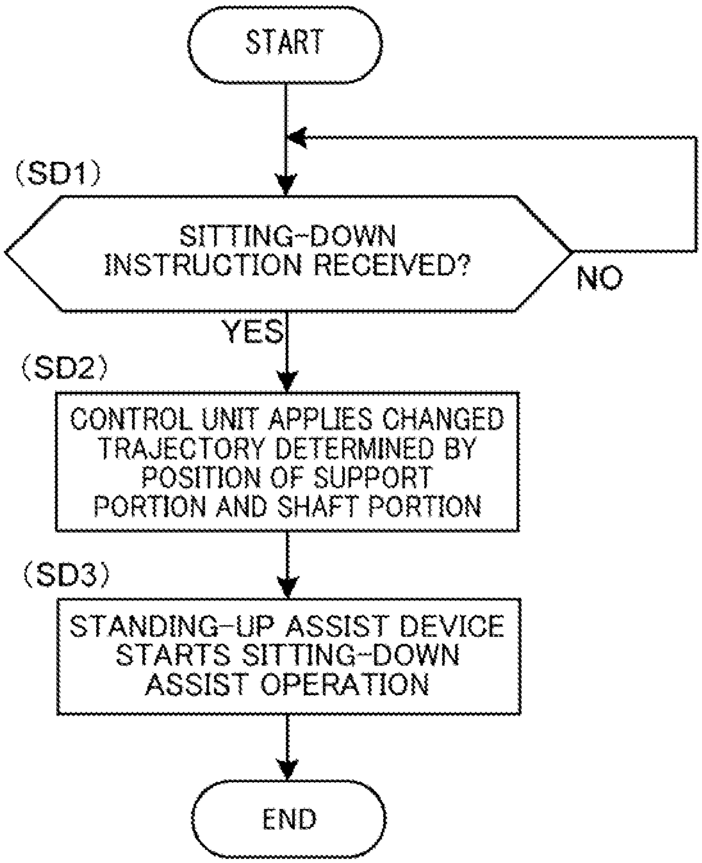
FIG. 16 is a flowchart showing operations of the standing-up assist device in sitting-down motion.

FIG. 16 shows a flowchart when the user J sits down on the seat K. If the control unit 56 receives a signal indicating a sitting-down instruction from the sitting-down instruction sensor 52B (step SD1: YES), the trajectory control unit 166 applies the changed trajectory determined by the positions of the support portion 14 and the shaft portion 12 (Step SD2). Then, under the control of the speed control unit 66, the standing-up assist device 1 starts the sitting-down assist operation for the user J (step SD3). If the control unit 56 does not receive the signal indicating the sitting-down instruction, the process returns to step SD1.

FIG. 17 shows an example of trajectories and support positions in which the control unit 56 performs sitting-down assist control on the standing-up assist device 1 for the physical information and the health information, which have been input. When the height of the user J is high, an assisting operation may be performed to make a trajectory to keep the position of the support portion 14 high. When the height thereof is short, an assisting operation is performed so that the position of the support portion in sitting down is kept low according to the height.

When the knee region and hip region of the user J are not good in the health condition, the user J may have difficulty bending and stretching the knees, so that the trajectory control unit 166 controls the operation of the support portion 14 to a trajectory in which the position of support portion 14 is kept low.

Configurations Supported by the Above Embodiment

The above embodiments are specific examples of the following configurations.

(Configuration 1)

A standing-up assist device including: a base portion; a shaft portion, having one end connected to the base portion, capable of moving at least up and down; a support portion provided at another end of the shaft portion; a control unit for controlling movement of the shaft portion; and a user information input unit to which information of a user is input, wherein, when a speed at which the support portion moves when the user is standing up is defined as a first moving speed, the control unit changes the first moving speed according to at least any of physical information and health information of the user, the information having been input from the user information input unit.

Such a configuration makes it possible to perform standing-up assist according to the body size and physical condition of the user. This produces an effect of helping the user to become independent.

(Configuration 2)

The standing-up assist device according to configuration 1, wherein when a speed at which the support portion moves when the user is sitting down is defined as a second moving speed, the control unit changes the second moving speed according to at least any of physical information and health information of the user, the information having been input from the user information input unit.

Such a configuration makes it possible to perform standing-up assist and sitting-down assist according to the body size and physical condition of the user. This produces an effect of helping the user to become independent.

(Configuration 3)

The standing-up assist device according to configuration 2, wherein the second moving speed is slower than the first moving speed.

Since the sitting-down motion is the motion of sitting down on a chair or the like that is on the back side of oneself and out of sight, the user may feel fear of changing the posture at the same speed as the standing-up motion. Such a configuration produces an effect that the sitting-down motion can be performed at a speed at which the user is less likely to feel fear.

(Configuration 4)

The standing-up assist device according to any one of configurations 1 to 3, wherein the health information is information on a state of a predetermined part in a body of the user.

When the user has difficulty standing up, there are various possible causes. Such a configuration makes it possible to perform assisting operations at a speed and on a trajectory according to the state of the body part of each user. This produces an effect of helping caregiving to the user.

(Configuration 5)

The standing-up assist device according to configuration 4, wherein the predetermined part in the body of the user includes at least any of a hip region and a knee region.

In many cases, lower-back pain and knee pain hinder standing-up motion and sitting-down motion. Such a configuration produces an effect of providing caregiving at a speed and on a trajectory suitable for the part where the pain is.

(Configuration 6)

The standing-up assist device according to any one of configurations 1 to 5, wherein the physical information is information of the user on at least any of height, weight, and a position of a center of gravity in standing up.

The user's normal posture, height, weight, etc. determines what posture should be aimed for to support and what speed and trajectory should be used for assist. Such a configuration produces an effect that makes it possible to provide caregiving according to the individual conditions of the user.

(Configuration 7)

The standing-up assist device according to any one of configurations 1 to 6, wherein the control unit changes a trajectory of the support portion in, at least, any of standing up and sitting down, according to information on a state of a predetermined part in a body of the user, the information having been input from the user information input unit.

Such a configuration produces an effect that: makes it possible to assist standing-up and sitting according to the physical handicap of the user; and therefore makes it possible to provide caregiving according to the individual conditions of the user.

The above-described embodiment illustrates one aspect of the present invention, and can be modified and applied in any way without departing from the spirit of the present invention. Of course, the aspect may be a combination of the first embodiment and the second embodiment.

In the above-described embodiment, the shaft portion 12 may include three or more shaft members in the front-rear direction. Further, the shaft portion 12 may include shaft members arranged in the left-right direction in addition to the shaft members arranged in the front-rear direction.

In the above-described embodiment, the chest contact support portion 36 may be provided with a load sensor to prevent the body of the user J from being pressed by the chest contact support portion 36 in sitting-down motion. In this case, when the load sensor detects the load on the chest contact support portion 36 due to contact with the user J while the control unit 56 controls the drive unit 51 to assist sitting-down motion, the control unit 56 stops driving by the drive unit 51.

Unless otherwise specified, the horizontal and vertical directions and individual numerical values, shapes, and materials in the above-described embodiments include a range (called a range of equivalents) including those producing the same effects as the directions, numerical values, shapes, and materials.

REFERENCE SIGNS LIST

1 standing-up assist device
10 base portion
12 shaft portion
14 support portion
56 control unit
58 user information input unit
J user

What is claimed is:

1. A standing-up assist device comprising:
- a base portion;
- a shaft portion, having one end connected to the base portion, capable of moving at least up and down;
- a support portion provided at another end of the shaft portion;
- a control unit for controlling movement of the shaft portion; and
- a user information input unit to which information of a user is input, the information of the user including at least any of physical information and health information of the user, and the health information of the user includes information on a state of a predetermined part in a body of the user, wherein,
- a speed at which the support portion moves when the user is standing up is defined as a first moving speed, the control unit changes the first moving speed according to at least any of the physical information and the health information of the user,
- the shaft portion includes a first shaft member and second shaft member that is at a front direction, of the user using the standing-up assist device and in a front-rear direction of the standing-up assist device, relative to the first shaft member, the first shaft member and the second shaft member each being expandable,
- a lower end portion of each of the first shaft member and the second shaft member is provided with a turning shaft for turning in the front-rear direction,
- the control unit changes a trajectory of the support portion in standing up, according to information on the state of the predetermined part in the body of the user, the trajectory being formed when the support portion is moved by expansion and contraction of the first shaft member and the second shaft member, and turning at the turning shaft of each of the first shaft member and the second shaft member, and
- when an input for the health information on the state of the predetermined part in the body of the user indicates that there is a pain in a knee region as the predetermined part in the body of the user, the control unit increases the contraction of the second shaft member against a predetermined normal trajectory in standing up.

2. The standing-up assist device according to claim 1, wherein
- a speed at which the support portion moves when the user is sitting down is defined as a second moving speed,
- the control unit changes the second moving speed according to at least any of the physical information and the health information of the user.

3. The standing-up assist device according to claim 2, wherein
- the second moving speed is slower than the first moving speed.

4. The standing-up assist device according to claim 1, wherein the predetermined part in the body of the user includes a hip region and the knee region.

5. The standing-up assist device according to claim 1, wherein
- the physical information is information of the user on at least any of height, weight, and a position of a center of gravity in standing up.

6. The standing-up assist device according to claim 1, wherein
- the control unit changes a trajectory of the support portion in standing up and sitting down, according to information on the state of the predetermined part in the body of the user.

* * * * *